(12) United States Patent
Goto et al.

(10) Patent No.: US 7,394,057 B2
(45) Date of Patent: Jul. 1, 2008

(54) ILLUMINATING DEVICE AND IMAGE DISPLAY DEVICE USING THE SAME

(75) Inventors: Takahiko Goto, Yokohama (JP); Takahiro Ohkura, Ome (JP)

(73) Assignees: Hitachi Media Electronics Co., Ltd., Oshu-Shi, Iwate (JP); Kyocera Optec Co., Ltd., Tokyo (JP)

( * ) Notice: Subject to any disclaimer, the term of this patent is extended or adjusted under 35 U.S.C. 154(b) by 0 days.

(21) Appl. No.: 11/674,812

(22) Filed: Feb. 14, 2007

(65) Prior Publication Data
US 2007/0279907 A1 Dec. 6, 2007

(30) Foreign Application Priority Data
Jun. 2, 2006 (JP) ............................ 2006-154812

(51) Int. Cl.
*F21S 8/00* (2006.01)
*G02B 9/00* (2006.01)

(52) U.S. Cl. ..................... 250/216; 362/277; 362/297; 353/97

(58) Field of Classification Search .......... 250/216, 250/227.11, 205, 228, 230; 362/257, 268, 362/277, 281, 296–298; 353/31, 37, 97–99; 349/61, 67, 113
See application file for complete search history.

(56) References Cited

U.S. PATENT DOCUMENTS

| 4,434,367 | A  | * | 2/1984 | Yonezawa ................. 250/311 |
| 6,923,546 | B2 | * | 8/2005 | Kurematsu ................. 353/97 |
| 6,999,245 | B1 | * | 2/2006 | Choi ......................... 359/738 |
| 2007/0171646 | A1 | * | 7/2007 | Kojima ....................... 362/268 |

FOREIGN PATENT DOCUMENTS

JP    2002-023266    1/2002

* cited by examiner

*Primary Examiner*—Kevin Pyo
(74) *Attorney, Agent, or Firm*—Antonelli, Terry, Stout & Kraus, LLP.

(57) ABSTRACT

An illuminating device according to the present invention comprises a first reflector for irradiating forward light beams from a light source, a second reflector that has an aperture and is disposed in front of the first reflector so as to reflect toward the light source the light beams from the first reflector to condense the light beams, a third reflector disposed so as to make the light beams condensed by the second reflector exit through the aperture, and a reflector moving means that moves the second reflector or the third reflector along an optical axis.

12 Claims, 11 Drawing Sheets

ILLUMINATING DEVICE AND IMAGE DISPLAY DEVICE USING THE SAME

CLAIM OF PRIORITY

The present invention claims priority from Japanese application JP2006-154812 filed on Jun. 2, 2006, the content of which is hereby incorporated by reference into this application.

BACKGROUND OF THE INVENTION

The present invention relates to an illuminating device and a projected image display device using the same. JP-A-2002-23266 discloses an art in which an aperture is inserted in an optical path of a projection display device so as to adjust a quantity of light.

In addition, an art has been proposed in which, as a means for increasing contrast ratio of a display image of a projection display device, thereby enhancing the brightness and darkness of the display image and increasing hue depth at intermediate scale, an aperture is mechanically and rapidly inserted in the light path, with a time cycle in synchronization with an image frame, so as to dynamically adjust a quantity of light.

Alternatively, an art has been proposed in which an illuminating element is utilized so as to transmit or diffract irradiated light, thereby adjusting a quantity of light at a light emitting side.

In general, in illuminating optical systems typified by a projection display device, a high-color-rendering discharge-lamp light source, such as a metal halide lamp, a high-pressure mercury lamp, or a xenon lamp, which is high-luminance and superior in the spectral characteristics has been utilized. In addition, a light source utilizing a light emitting diode (LED), which is superior in lifetime, has recently been put into practical use.

Because high color rendering properties are demanded to the foregoing light sources, stable discharge performance and stable lighting drive performance are needed. In other words, it is required that the light source is kept lighted at a constant quantity of light and therefore, the quantity of light cannot quickly be changed.

However, in an image display device such as a front projector or a rear projection TV, in order to emphasize, in accordance with an image scene, the difference between brightness and darkness, thereby enhancing intermediate-gradation rendering power, needs to dynamically and quickly changing a quantity of light for enhancing the contrast of a projected image has been aroused.

As means for projecting an image by dynamically and quickly changing a quantity of light, arts for an illuminating device in which, as described above, an aperture is mechanically inserted in the light path, an illuminating device in which an illuminating element whose light transmission amount is changed when voltage is applied is permanently provided, and the like have been proposed.

In the foregoing mechanical illuminating device, when an aperture pivoting part is continuously and quickly pivoted forward and backward around a pivoting axis, it becomes a cause to raise mechanical vibration and acoustic noise by receiving influence of inertia of the aperture pivoting part.

Meanwhile, in the illuminating device in which the illuminating element is permanently provided in the light path of the illuminating optical system, because loss of passing light is inevitable, efficiency of light is deteriorated, whereby brightness is reduced.

In the background described above, in image display devices such as a front projector and a rear projection TV, high display-image luminance and high display-image contrast ratio are important items that raise the values of the image display devices and therefore, the mechanical illuminating device, in which an aperture is inserted only when needed so that light for an illuminating optical system is efficiently introduced, have become dominant.

FIG. 12 is an external view of a conventional mechanical illuminating device, and FIG. 13 is a cross-sectional view of an optical apparatus equipped with the illuminating device.

In FIG. 12, reference characters 7a and 7b denote a pair of apertures for dynamically cutting off a light beam irradiated from the light source so as to narrow down the quantity of light and the apertures, each have a pivoting axis 7c, are opened or closed symmetrically with each other, through the mechanical power of an actuator 8. The illuminating device is mounted in an optical apparatus shown in FIG. 13 and incorporated in an image display device.

In general, light beams 9 emitted from a high-color-rendering point light source 1 which is high-luminance and superior in the spectral characteristics, such as a metal halide lamp, a high-pressure mercury lamp, a xenon lamp, or an LED, are condensed or parallelized, in front of the point light source 1, by a first reflector 2 utilizing an elliptic mirror or a parabolic mirror.

The apertures 7a and 7b of the illuminating device are arranged in the light path in front of the first reflector 2 and in response to an image signal of the image display device, the opening and closing operation of the apertures 7a and 7b is performed. In general, the opening and closing operation of the apertures 7a and 7b is performed, with a time cycle corresponding to every video-image frame and with high-speed direct drive way of a magnetic motor utilizing a voice coil, and the like. An optimal control signal is inputted to a servo circuit of the illuminating device to drive the actuator 8 so that the apertures 7a and 7b are pivoted in a closing direction so as to further narrow down the light beam 9 when light arrangement in an image to be displayed is dark in average, and reversely, the apertures 7a and 7b are pivoted in an opening direction to be apart from the light path so as to reduce loss in the light beam 9 when the light arrangement in an image to be displayed is bright in average.

The size of the pair of apertures 7a and 7b is required to be large enough to cover the light beam 9 emitted from the first reflector 2. When narrowing down the light beam 9, the apertures 7a and 7b are exposed to a high-intensity light beam and therefore, a material that has a high heat resistance and is hard to deform is selected. Moreover, in order to prevent interference between the frames of image projected from the projection lens, thereby dynamically narrowing down the quantity of light, the opening and closing operation of the apertures 7a and 7b is performed at high speed, with a time cycle corresponding to video image frame frequency of 60 Hz, in general; therefore, the apertures 7a and 7b are each required to have a minimal size and a minimal mass so as to ensure necessary strength thereof and reduce the inertia of the pivoting part. In order to satisfy the foregoing condition elements, a metal material such as a thin aluminum plate is suitable.

As described above, the light beam 9 that has been light-adjusted in the illuminating device passes through an integrator 12 such as, in general, a condenser lens or an illuminating rod for a kaleidoscope, so that the distribution of light intensity on the irradiation plane is improved, whereby the uniformity is raised. Subsequently, the light beam 9 passes through a spectroscope 13, such as, in general, a dichroic mirror, a prism, or a color wheel, and is converted into primary colors, such as Red, Green, and Blue, and the like. Subsequently, the resultant rays pass through a reflection-type or transmission-type image element 14, so that an image, which is a frame image in which respective primary-color images are integrated, is created, and the image passes through a projection lens unit 15 and is projected onto a screen, as a final image.

As described above, in a conventional illuminating device, by utilizing an aperture, which mechanically opens and closes, in the light path of the illuminating optical system, a light beam is dynamically narrowed down. By performing opening and closing operation with a time cycle corresponding to every image frame frequency, a projected image, in which still images each having well-defined rendering power, a high contrast ratio, and sharpness are created, is perceived as a high-quality continuous image.

However, when an artificial aperture is inserted into and removed from the light path of the illuminating optical system of a projection display device or the like, a light beam at an edge of an artifact, in other words, a light beam at a boundary portion between a dark image portion the light beam for which is cut off by the aperture and a bright image portion the light beam for which passes through the aperture without being cut off diffracts, thereby producing the difference in the light path length, whereby an aberration is caused. When the aberration exceeds a given limitation, the aberration deteriorates the image quality of an image projected onto a screen and is perceived as color unevenness.

Moreover, the aperture pivoting part continuously and rapidly repeats the forward and backward movement around the pivoting axis, and design, in which the motor torque required for acceleration and forward-and-backward switching is made to have a enough margin for the inertia of the aperture pivoting part, is needed, and therefore, the voice coil, the magnetic circuit, the servo circuit, and the like become sizable, thereby making the downsizing of the illuminating device difficult.

Still moreover, the foregoing forward and backward movement around the pivoting-axis is accompanied by a mechanical vibration and acoustic noise, and therefore, in order to improve the acoustic noise to the extent such that it can aurally be allowed, a housing of the illuminating device needs to be rigid, thereby hindering the downsizing of the illuminating device and ensuring of the reliability.

SUMMARY OF THE INVENTION

An objective of the present invention is to provide an illuminating device capable of performing high-speed light-adjustment control and an image display device using the same.

An illuminating device according to the present invention comprises: a light source; a first reflector for irradiating in a forward direction light beams emitted from the light source which is arranged on an optical center of the first reflector; a second reflector which has an aperture provided on an optical axis and is disposed in front of the first reflector so as to reflect toward the light source the light beams irradiated from the first reflector to condense the light beams; a third reflector disposed between the first reflector and the second reflector so as to make the light beams condensed by the second reflector exit through the aperture; and a reflector moving means for supporting the second reflector or the third reflector and moving the supported reflector along the optical axis, wherein the reflector moving means moves the second reflector or the third reflector so as to change the distance therebetween, thereby adjusting a quantity of light beams that pass through and exit from the aperture.

The illuminating device may be configured in such a way that the first reflector and the second reflector are fixed spaced a predetermined distance apart from each other, a supporting body is disposed between the first reflector and the second reflector, the third reflector is supported by a side, of the supporting body, that opposes the second reflector, the reflector moving means is disposed outside light paths formed between the first reflector and the second reflector, and the supporting body is moved by the reflector moving means along the optical axis.

The illuminating device may be configured in such a way that the third reflector is supported by a supporting body, the supporting body and the first reflector are fixed, and the second reflector is moved by the reflector moving means along the optical axis.

It is preferable that an antireflection film is formed on a region other than regions, of the supporting body, that support the third reflector.

It is preferable that the first reflector, the second reflector, and the third reflector each have a reflection surface having a light reflectance of 97% or larger at wavelength from 420 nm to 680 nm.

The reflector moving means may be configured in such a way that the same has an excitation coil provided on a movable portion of the supporting body that support the second reflector or the third reflector and a permanent magnet that is fixed spaced a small gap apart from the excitation coil and extends along the optical axis, and the second reflector or the third reflector is moved by applying a pulse current to the excitation coil.

A light guiding body may be disposed in the aperture of the second reflector.

The structure may be in such a way that the reflector moving means switches in a plurality of stages the distance between the second reflector and the third reflector.

The structure may be in such a way that the distance between the second reflector and the third reflector is adjusted in accordance with a system control signal.

It is preferable that a circulation reflector for recirculating the light beams toward the first reflector is provided on a side, of the supporting body for supporting the third reflector, which opposes the first reflector.

It is preferable that the circulation reflector has a reflection surface having a light reflectance of 97% or larger at wavelength from 420 nm to 680 nm.

An image display device according to the present invention comprises: an illuminating device, for emitting light beams, which includes a light source, a first reflector for irradiating in a forward direction light beams emitted from the light source which is arranged on an optical center of he first reflector, a second reflector which has an aperture provided on an optical axis and is disposed in front of the first reflector so as to reflect toward the light source the light beams irradiated from the first reflector to condense the light beams, a third reflector disposed between the first reflector and the second reflector so as to make the light beams condensed by the second reflector exit through the aperture, and a reflector moving means for supporting the second reflector or the third reflector and moving the supported reflector along the optical axis, wherein the reflector moving means moves the second reflector or the third reflector so as to change the distance therebetween, thereby adjusting a quantity of light beams that pass through and exit from the aperture; an image element onto which the light beams emitted from the illuminating device are irradiated to create images; and a lens unit that projects as projected images the images created by the image element.

The present invention, configured as described above, can provide an illuminating device that can perform high-speed light-adjustment control and an image display device using the same.

Other objects, features and advantages of the invention will become apparent from the following description of the embodiments of the invention taken in conjunction with the accompanying drawings.

DETAILED DESCRIPTION OF THE PREFERRED EMBODIMENTS

A first embodiment of an illuminating device and a image display device according to the present invention will be described with reference to FIGS. 1 to 7.

Figure 1:
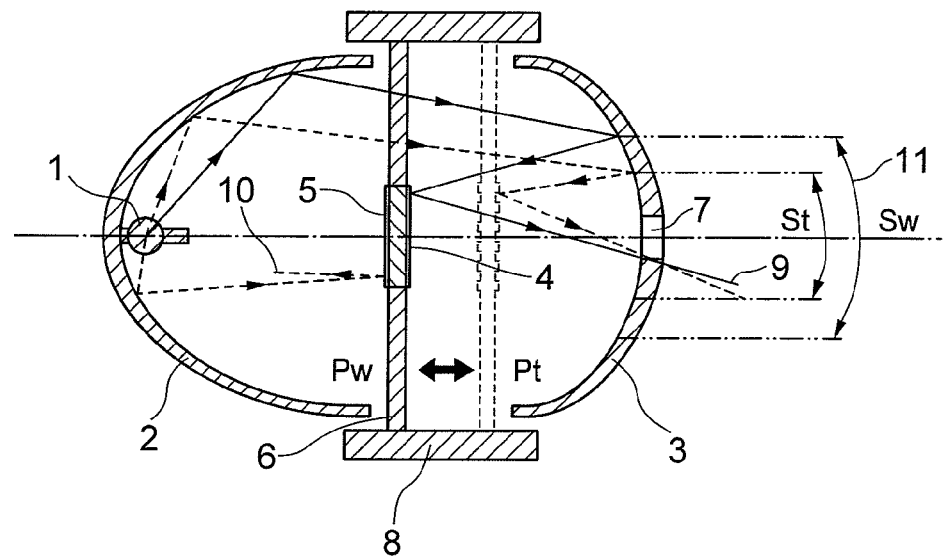
FIG. 1 is a cross-sectional view of a first embodiment of an illuminating device according to the present invention.

In FIG. 1, Reference Numeral 1 denotes a high-color-rendering point light source, such as a metal halide lamp, a high-pressure mercury lamp, a xenon lamp, or an LED, that is high-luminance and superior in the spectral characteristics. The light source 1 is disposed in the vicinity of a middle-bottom portion (on an optical center) of a first reflector 2 utilizing an elliptic mirror, a parabolic mirror, or the like, and a spherical-surface or aspherical-surface second reflector 3, having a concave contour, which is designed so as to reflect and condense light beams is disposed in front of the first reflector 2. An aperture 7 is formed in the vicinity of a middle-bottom portion (on an optical axis) of the second reflector 3.

As shown in FIG. 1, the first reflector 2 and the second reflector 3 are designed so that diameters of their openings are approximately the same, their openings oppose each other with a predetermined distance interposed therebetween, and a drive plate 6 is disposed between the openings. The drive plate 6 is formed of a base material having an extremely high transmittance and a low refraction index, and a glass plate that is extremely thin and has a high surface accuracy is suitable for the base material. In the vicinity of an optical center of the drive plate 6, a circulation reflector 5 is formed on a surface of the drive plate 6 opposite to the first reflector 2, and a third reflector 4 is formed on a surface of the drive plate 6 opposite to the second reflector 3. The circulation reflector 5 and the third reflector 4 are formed, in the approximately the same coverage (area), on symmetric positions on front and rear surfaces of the drive plate 6.

Although glass plate is utilized as the drive plate 6, a transparent resin such as a polycarbonate or a polymethylmetacrylate may also be utilized. In addition, instead of the drive plate 6, a flat plate material on front and rear sides of which the circulation reflector 5 and the third reflector 4 are formed may be utilized by partially fixing it with a wire or a frame. In this case, the wire and the frame may not be transparent materials; however, it is desirable that they are transparent in terms of the utilization efficiency of light.

The respective reflection surfaces of the reflectors 2 to 5 are covered with reflection films each having a high light reflectance of 97% or larger at wavelength from 420 nm to 680 nm. The reflection film having the foregoing characteristics is configured by, for example, a base dielectric film on a surface of a base material, a reflection film thereon, a first transparent dielectric film thereon, and a second transparent dielectric film thereon.

The base dielectric film is formed of at least one chemical compound selected from a group of $LaTiO_3$, $La_2Ti_3O_8$, $TiO_2$, $SiO_2$, and $Al_2O_3$. The foregoing reflection film is formed of silver. The first transparent dielectric film is formed of $MgF_2$ or $SiO_2$. The second transparent dielectric film is formed of at least one chemical compound selected from a group of $LaTiO_3$, $La_2Ti_3O_8$, $TiO_2$, $SiO_2$, and $Al_2O_3$. Additionally, surface roughness of the first transparent dielectric film is limited to 3 nm or less. It is preferable that film thickness of the base dielectric film is 30-80 nm. It is preferable that film thickness of the reflection film is 70-130 nm. The first transparent dielectric film and the second transparent dielectric film configure a high-reflectance film by means of a multi-layer interference film and the respective film thicknesses thereof are appropriately determined based on refraction indexes thereof and wavelength of the light beam.

Figure 6:
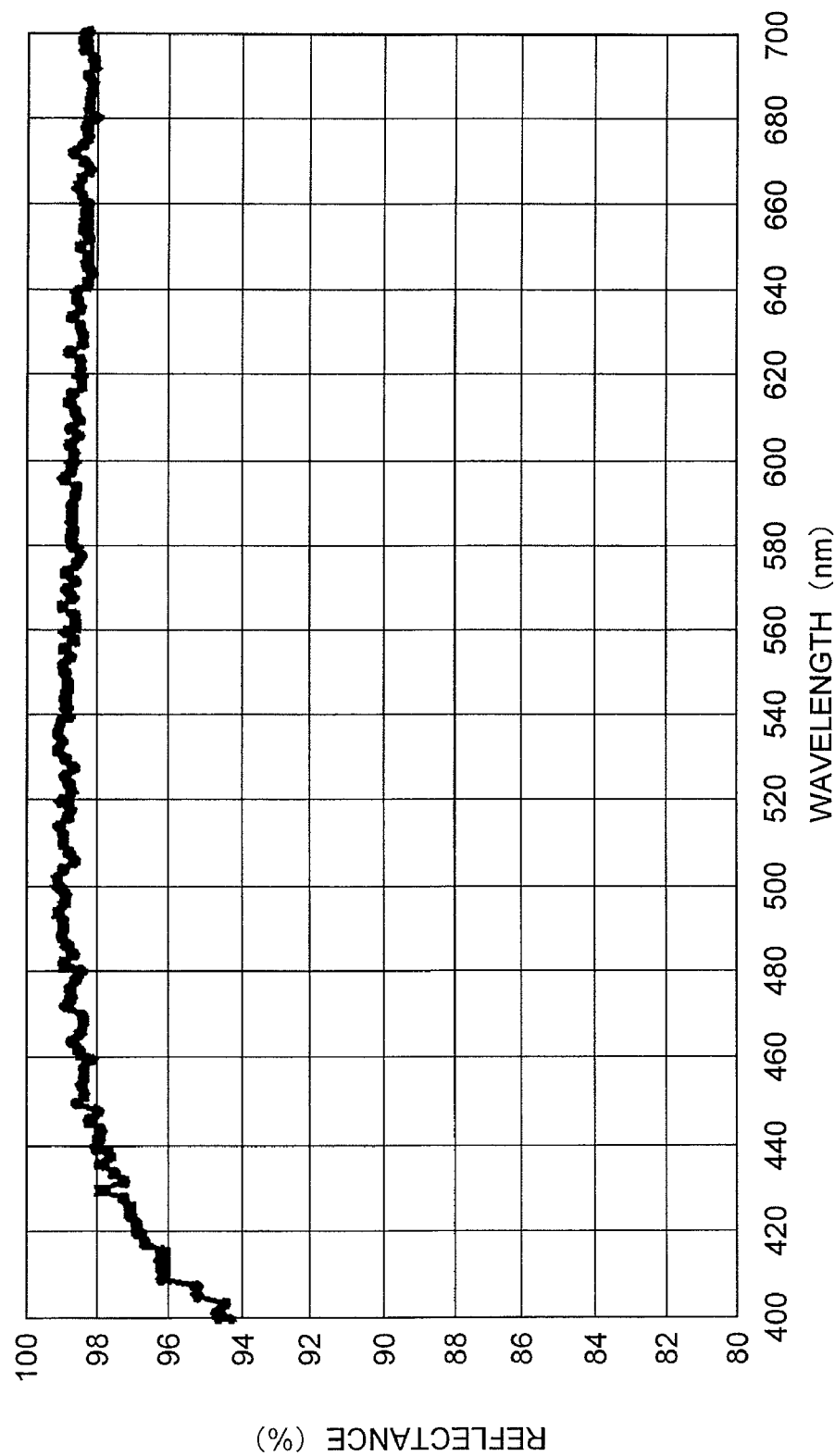
FIG. 6 is a graph representing the light-reflectance characteristic of each reflector in the first embodiment of the illuminating device according to the present invention.

As is apparent from FIG. 6, respective reflectances of the reflectors 2 to 5 are 97% or larger (97-99%) with respect to wavelength from 420-680 nm. As this, by making the reflection surfaces of the reflectors 2 to 5 high-reflectance, the attenuation of light beam can be suppressed to a minimal level.

Figure 2:
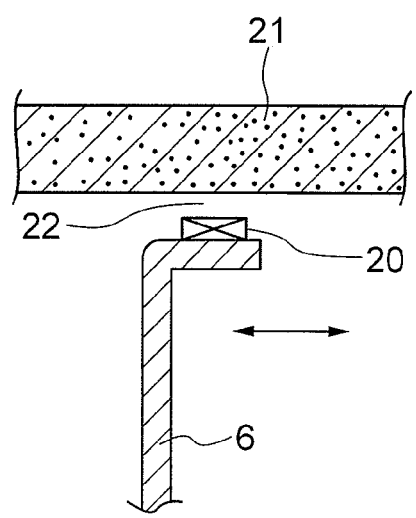
FIG. 2 is an enlarged cross-sectional view of an actuator in the illuminating device.

Peripheral portion of the drive plate 6 extends to outsides of the reflectors 2 and 3 and is configured in such a way that the position thereof can be controlled by an actuator 8, disposed outside of the reflectors 2 and 3, in parallel with the optical axis and at high speed. As shown in FIG. 2, the actuator 8 is configured with a plurality of excitation coils 20 mounted on the peripheral portion of the drive plate 6 and a permanent magnet 21 elongated in a direction (along the optical axis) in which the drive plate 6 travels, and a small gap 22 is formed between the excitation coils 20 and the permanent magnet 21. Thus, by applying a predetermined pulse current to the excitation coils 20, with a time cycle corresponding to a video-image frame of frequency 60 Hz, the drive plate 6 can be moved rapidly to a predetermined position.

Light beams 9 emitted from the light source 1 are then irradiated by the first reflector 2 in the forward direction of the light source 1. When, as the reflector 2, an elliptic mirror is utilized, condensed light beams are obtained, and when a parabolic mirror is utilized, parallel light beams are obtained. The light beams 9 irradiated in the forward direction penetrates forward through a portion where no reflector is formed, on the drive plate 6, other than the circulation reflector 5, and the second reflector 3 having a sphere-surface or an asphere-surface contour reflects the light beams 9 toward the vicinity of the optical center on the light source 1 side, and the reflected light beam 9 is reflected again by the third reflector 4 in the forward direction. In addition, although not illustrated, an antireflection film is formed on a portion, facing the first reflector 2, where no reflector is formed, on the drive plate 6, other than the circulation reflector 5.

The aperture 7 (opening window), which limits a spot diameter of the light beams that finally exit from the illuminating device and allows effective light beams to pass, is formed in the vicinity of the optical center of the second reflector 3, and the light beams 9 that have passed through the aperture (opening window) is emitted to the outside of the illuminating device.

As described above, the third reflector 4 is formed on the drive plate 6 in order to output the light beams 9 from the aperture 7. The circulation reflector 5 is formed at the side of the drive plate 6 facing the first reflector 2 in order to reflect the light beams 9 which have reached a region, rear of the third reflector 4, where light beams are nullified, toward the first reflector 2 as light beams 10. As this, by providing the circulation reflector 5 so as to make the light beams circulate again, the loss in the light beams 9 can be suppressed as much as possible.

As described above, the third reflector 4 and the circulation reflector 5 are formed on the front and the rear surface of the drive plate 6. That is because the actuator 8 cannot be disposed in the light path inside the illuminating device, and thus, in order to dispose the actuator 8 outside the light path formed between the first reflector 2 and the second reflector 3 and transfer driving power of the actuator 8 to the third reflector 4 and the circulation reflector 5, the drive plate 6, formed of a base material having an extremely high transmittance and a low refraction index, is utilized for performing remote operation, so that the loss in the light beams 9 is minimized.

Accordingly, the positions of the third reflector 4 and the circulation reflector 5 can be controlled under the condition that the third reflector 4 and the circulation reflector 5 are disposed in the vicinity of the optical centers illustrated in FIG. 1, no structure that may cause the loss in the light beams 9 exists around them, and the third reflector 4 and the circulation reflector 5 are optically afloat in the light path.

Next, the light-adjustment principle of the illuminating device will be described. As shown in FIG. 1, the illuminating device is configured with a total light reflection and a light condensation.

Initially, the third reflector 4 is moved by means of driving power of the actuator 8 to a position (to the position Pw in FIG. 1, as indicated by a solid line) closer to the first reflector 2. The light beams 9 emitted from the light source 1 proceed as indicated by a solid line in the light path including the first reflector 2, the second reflector 3, the third reflector 4, and the aperture 7, and then exit from the illuminating device. With the third reflector 4 situated at the foregoing position (Pw in FIG. 1), 100% of the light beams that have been irradiated from the first reflector 2 to the second reflector 3 are totally reflected by the third reflector 4 and emitted through the aperture 7 (opening window).

In this situation, an effective irradiation coverage 11 of the second reflector 3 is indicated by Sw in FIG. 1, and by performing optical design for the light-path length, the respective diameters and curvature radiuses of the reflectors, the focal lengths, diaphram aperture diameter, and the like, the light beams 9 emitted from the light source 1 exit without being narrowed down by the opening window of the aperture 7. In addition, it is also possible that the distance between the first reflector 2 and the second reflector 3 or the incidence angle at the second reflector 3 is adjusted so as to make the light beams 9 leak though the gap, thereby arbitrarily adjusting a quantity of light transmitted between the first reflector 2 and the second reflector 3.

Next, the third reflector 4 is moved by means of driving power of the actuator 8 to a position (to the position Pt in FIG. 1, as indicated by a dotted line) closer to the second reflector 3. As indicated by a dotted line, the light beams 9 emitted from the light source 1 proceed while repeating reflections, similar to the above description; however, the light path length between the second reflector 3 and the third reflector 4 is shortened, whereby light beams reflected by the second reflector 3 are irradiated onto the third reflector 4, in an area wider than the effective reflection surface of the third reflector 4. In other words, the intensity of lights that are irradiated on the effective reflection surface of the third reflector 4 are lowered, and thus, the effective irradiation coverage 11 of the second reflector 3 is limited to the range indicated by St in FIG. 1, whereby a quantity of the light beams 9 that can exit through the opening window of the aperture 7 decreases to St/Sw. In this manner, by arbitrarily controlling the position of the third reflector 4, an amount of exiting lights can be adjusted. The light beams, among the light beams reflected by the second reflector 3, which do not fall within the effective reflection surface of the third reflector 4 penetrate the drive plate 6 and proceed to the first reflector 2, and then the light beams are reflected again by the first reflector 2 in the forward direction and circulate.

In addition, exit angles of the light beams 9 that can exit through the opening window of the aperture 7 vary depending on the position of light adjustment and therefore, the irradiation coverage are variable. In the case where the illuminating device is applied to an image display device or the like, it is required to obtain a certain irradiation coverage, and in such cases, a stationary aperture opening window may be provided after the illuminating device in the light path.

Figure 7:
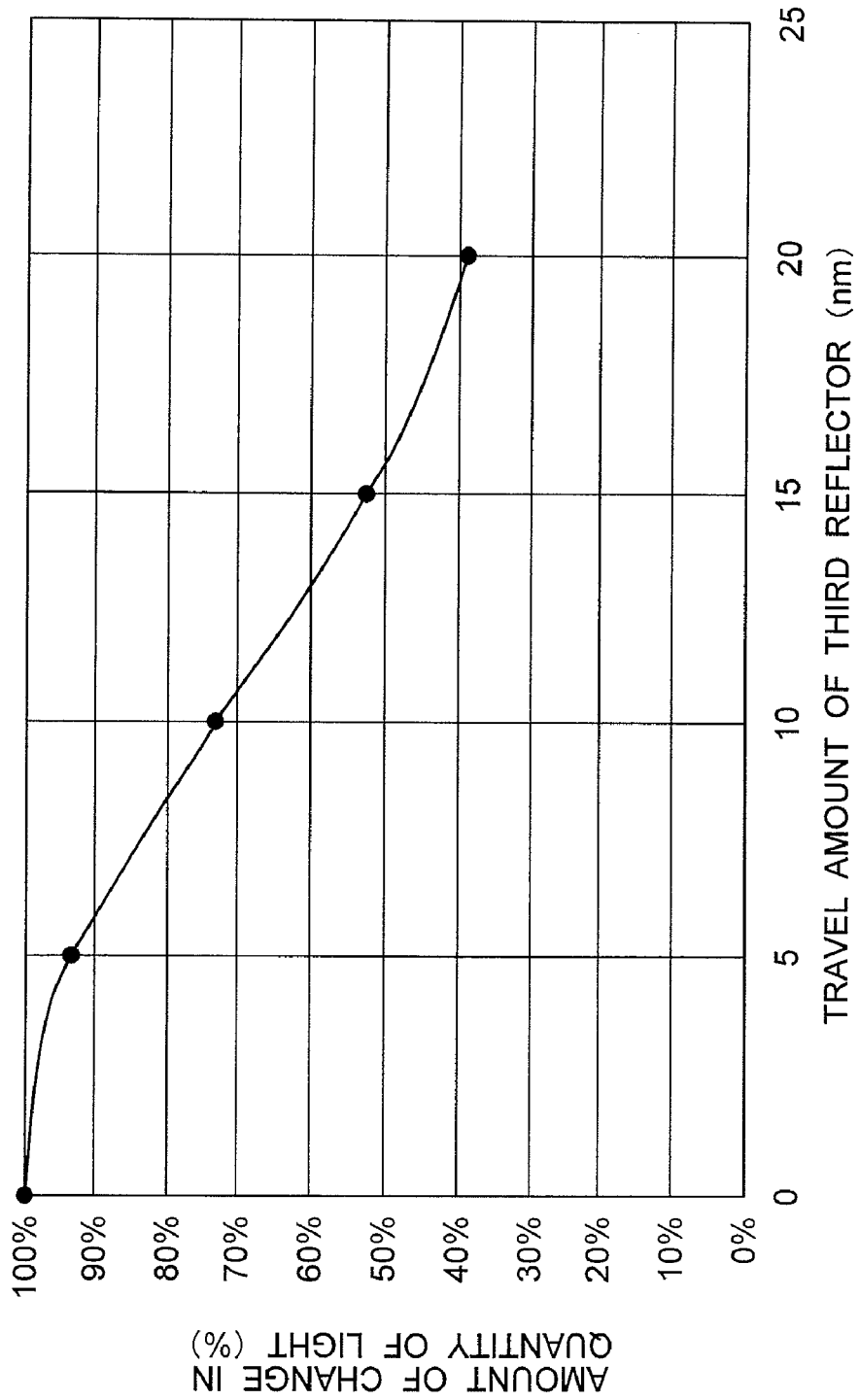
FIG. 7 is a characteristic graph representing an amount of change in exiting light beams vs. a travel amount of a third reflector in the first embodiment of the illuminating device according to the present invention.

FIG. 7 is a characteristic graph representing an amount of change in light beams that exit through the opening window of the aperture 7, in the case where the third reflector 4 is moved along the optical axis. As shown in FIG. 7, the position of the third reflector can be changed in a plurality of stages, and the amount of change in the quantity of light changes depending on the position of the third reflector. Therefore, the amount of change in the quantity of light follows the travel distance of the third reflector, and it shows that light adjustment is possible.

In the present embodiment, as described above, a plurality of reflection mirrors are employed so as to utilize the nature of light such as total reflection and condensation, and because no transmission lenses are utilized, the effects of diffraction and aberration can be reduced, and light beams emitted from the light source can efficiently be utilized.

In addition, the arrangement and the structure of the reflectors are not limited to those in the embodiment shown in FIG. 1. For example, the direction of the exiting light may not be parallel to the optical axis, but may be inclined, e.g., by 90° from the optical axis.

The actuator 8 that moves the third reflector 4 performs forward and backward movement that is parallel to the optical axis and one-dimensional. Therefore, the inertia of the driving unit can be suppressed to be lower than that of a conventional mechanical illuminating device, thereby reducing mechanical vibration and acoustic noise, and the improvement of reliability as well as downsizing can be performed.

Figure 3:
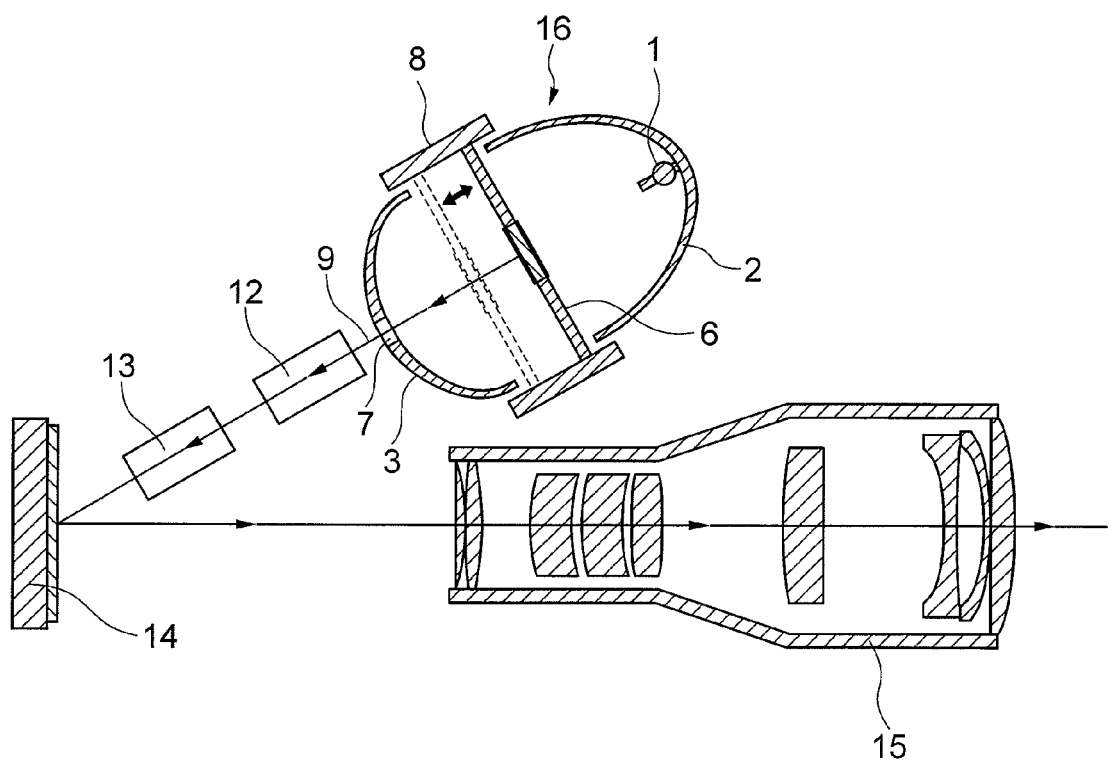
FIG. 3 is a cross-sectional view of an optical apparatus equipped with the illuminating device.

The illuminating device 16 configured as described above is mounted, e.g., in an optical apparatus shown in FIG. 3. As shown in FIG. 3, the light beams 9 that have been light-adjusted in the illuminating device 16 pass through an integrator 12 such as a condenser lens or an illuminating rod for a kaleidoscope, and the distribution of light intensity on the irradiation plane is improved, and the uniformity is raised. Subsequently, the light beams 9 pass through a spectroscope 13 such as a dichroic mirror, a prism, or a color wheel and are converted into primary colors, such as Red, Green, and Blue, and the like. Subsequently, the resultant rays pass through a reflection-type or transmission-type image element 14, so that an image, which is a frame image in which respective primary-color images are combined, is created, and the image passes through a projection lens unit 15 and is projected onto a screen, as a final image.

Figure 4:
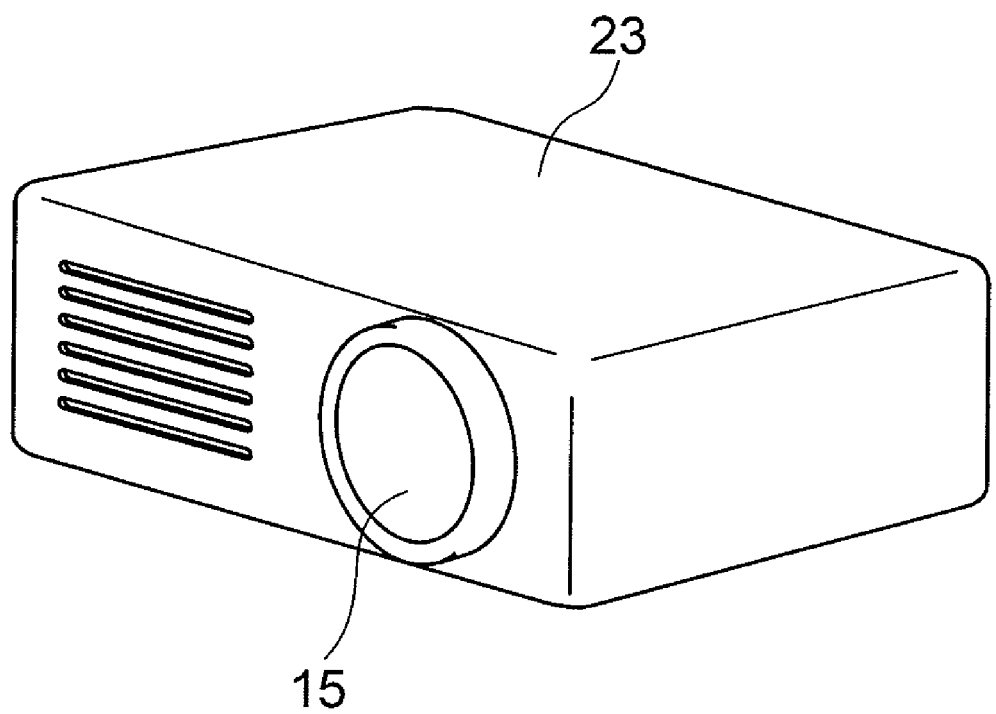
FIG. 4 is an external view for an image display device according to the present invention.

Referring to FIG. 4, from a portion of a casing 23, part of the projection lens unit 15 is exposed.

Figure 5:
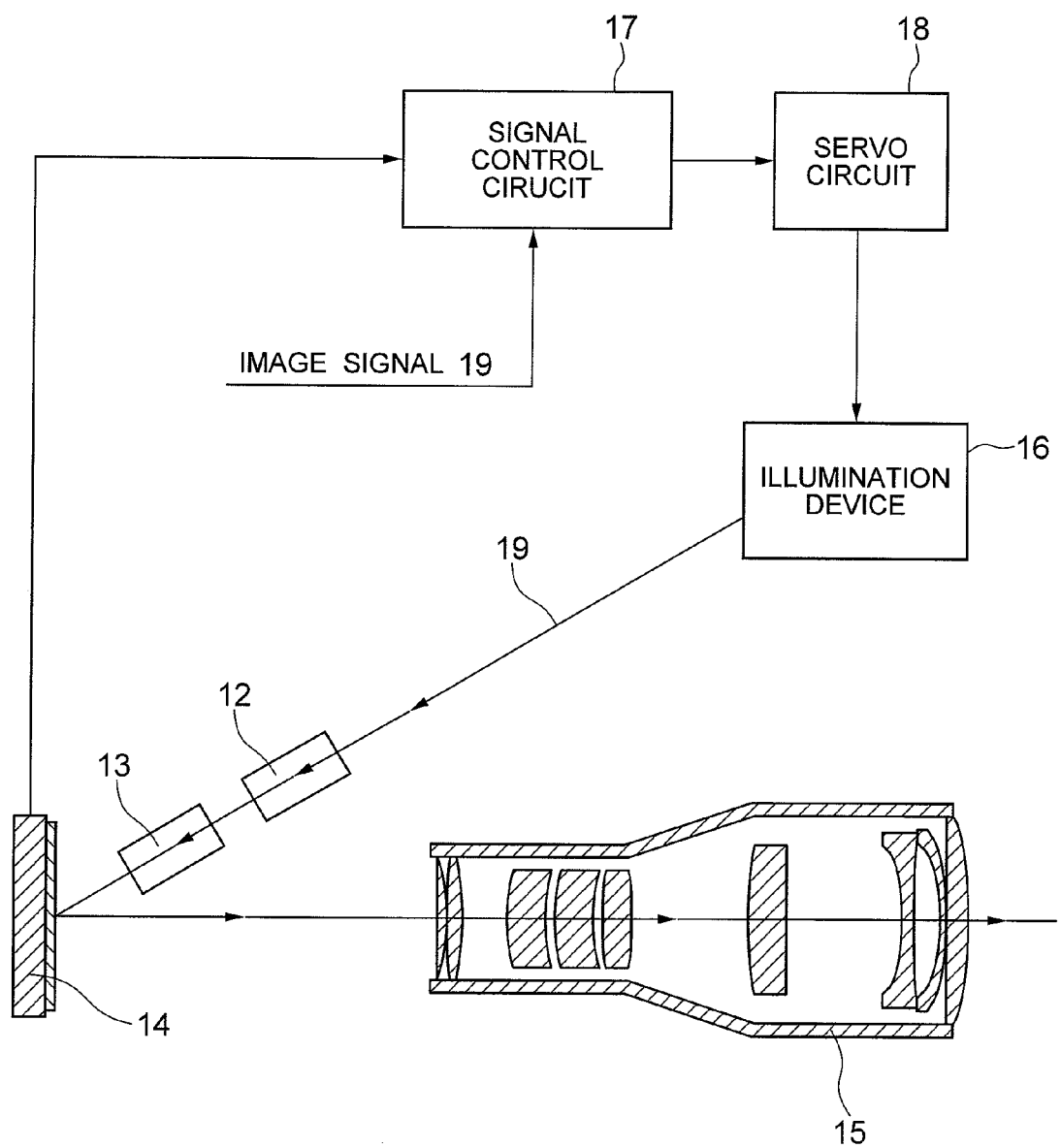
FIG. 5 is a block diagram of the image display device.

As shown in FIG. 5, the projection display device has a signal control circuit 17 and a servo circuit 18, in addition to the integrator 12, the spectroscope 13, the image element 14, the projection lens unit 15, and the illuminating device 16.

In response to the bright and dark levels of an image signal 19, image processing is performed every frame by the signal control circuit 17 in an optical engine, and the average luminance is calculated. In accordance with the obtained luminance information, an optimal diaphragm amount for the illuminating device 16 is calculated, and then a drive signal for the illuminating device 16 is inputted to the servo circuit 18.

An optimal driving signal is determined so as to rapidly move the third reflector 4, toward the second reflector 3 in order to narrow down the light beam 9 more in the case of a scene in which the light arrangement in an image to be displayed is dark in average and the luminance thereof is low, or toward the first reflector 2 in order to narrow down the light beam 9 less in the case of a scene in which the light arrangement in an image to be displayed is bright in average and the luminance thereof is high. For the accurate positional control, for example, a position control technology, for automatic focusing lens of a digital camera, which utilizes a position detection sensor is suitable.

Electric power for driving the actuator 8 is supplied from the servo circuit 18 to the illuminating device 16 so that the position of the third reflector 4 is controlled every frame signal. As a result, light beams, which have been light-adjusted in accordance with the brightness and darkness level of an image signal, are irradiated from the illuminating device 16. As described above, the light-adjusted light beams 9 sequentially pass through the integrator 12, the spectroscope 13, the image element 14, and the projection lens unit 15 and are projected onto a screen as an image.

With an illuminating device and an image display device according to the present invention, no mechanical aperture exists in the light path, as described above, and therefore, the effect of diffraction and aberration caused by the illuminating device can be reduced, and light beams emitted from the light source can efficiently be utilized. Projected images, in which still images each having well-defined rendering power, a high contrast ratio, and sharpness are created, are perceived as high-quality continuous images.

In the present embodiment, the structure has been explained in which, as described above, the illuminating device performs high-speed operation in accordance with every image frame, and the projected images become high-contrast, dynamic, and high-quality. However, a case may be considered in which, after a user carries out light adjustment by means of remote control, the third reflector is semi-fixed, so that the image display device is utilized at an obtained constant luminance, for example. In this case, no problem is posed even though the speed of the actuator is low.

Figure 8:
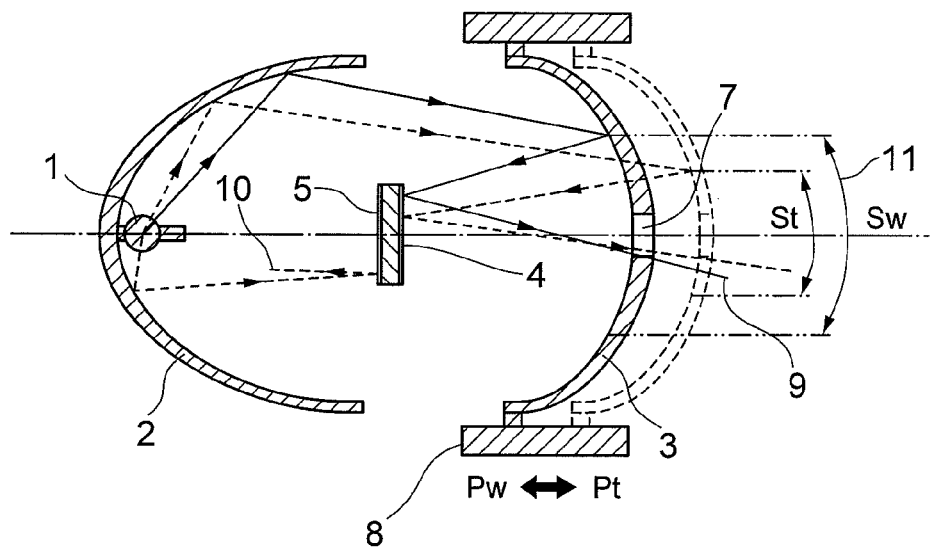
FIG. 8 is a cross-sectional view of a second embodiment of the illuminating device according to the present invention.

Next, a second embodiment of an illuminating device according to the present invention will be described with reference to FIG. 8. The second embodiment differs from the first embodiment in the structure that no movable drive plate 6 exists, the positions of the third reflector 4 and the circulation reflector 5, which are provided on a glass plate or the like, are fixed, and the second reflector 3 is moved by means of the actuator 8.

In the first embodiment, the actuator 8 cannot be disposed in the light path inside the illuminating device and therefore, in order to dispose the actuator 8 outside the light path and transfer the driving power of the actuator 8 to the third reflector 4 and the circulation reflector 5, the drive plate 6, formed of a base material having an extremely high transmittance and a low refraction index, is utilized for performing remote operation. In the second embodiment, in order to efficiently transfer the driving power of the actuator 8, the second reflector 3 is made be movable and the position control is performed. The principle of light adjustment is the same as that in the first embodiment.

Figure 9:
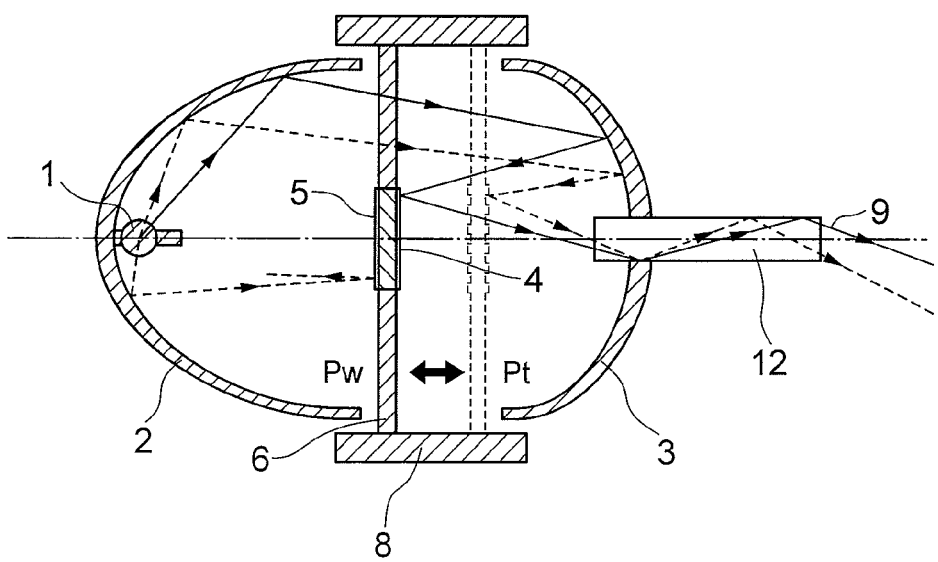
FIG. 9 is a cross-sectional view of a third embodiment of the illuminating device according to the present invention.

Next, a third embodiment of an illuminating device according to the present invention will be described with reference to FIG. 9. The third embodiment differs from the first embodiment in that a light guiding body such as the integrator 12 is inserted in a fixed opening portion provided in the vicinity of the optical center of the second reflector 3. The integrator 12 is formed of a rod-like light guiding body, e.g., for illuminating of a kaleidoscope. The light guiding body can be formed by use of glass, transparent resin, or the like. As described above, because the light beams on the irradiation plane of the illuminating device provided with the light guiding body such as the integrator 12 have a high-uniformity distribution of light intensity, and the structure of the light-adjusting system equipped with the illuminating device can be simplified. In FIG. 9, a structure in which the drive plate 6 is moved is shown but the third embodiment can be applied also to a structure in which the second reflector 3 is moved.

Existing projection-type illuminating devices have the light source 1 and the first reflector 2, and therefore, by adding thereto the second reflector 3, the third reflector 4, and the circulation reflector 5, an illuminating device may be structured.

The illuminating device according to the present invention can be applied not only to an image display device but also to various industrial fields, in combination with a light source that lights with a constant quantity of light and has a high light intensity; for example, the illuminating device can be applied to light-adjusting systems for various kinds of illuminating devices for a motor vehicle, a motorbike, and the like or a measurement apparatus, such as a measurement apparatus for semiconductors, which needs a light source.

Figure 10:
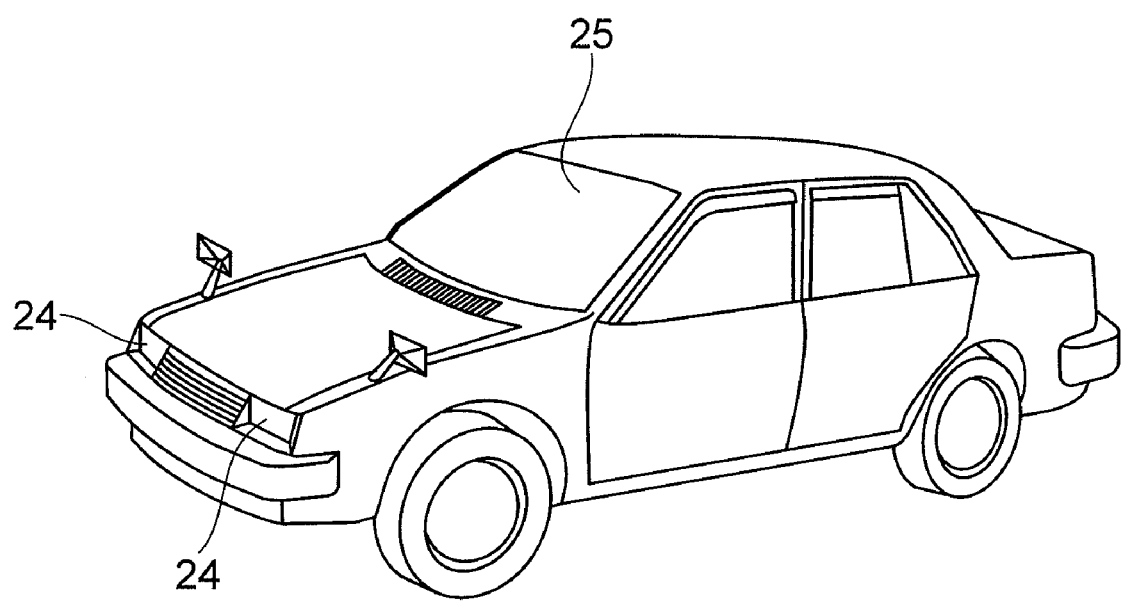
FIG. 10 is a perspective view of a motor vehicle equipped with the illuminating device according to the present invention.

FIG. 10 is a perspective view of a motor vehicle to which the illuminating device according to the present invention is applied. Headlights 24 disposed at the left and right sides of a motor vehicle 25 each incorporate the illuminating device (not shown) according to the present invention.

Figure 11:
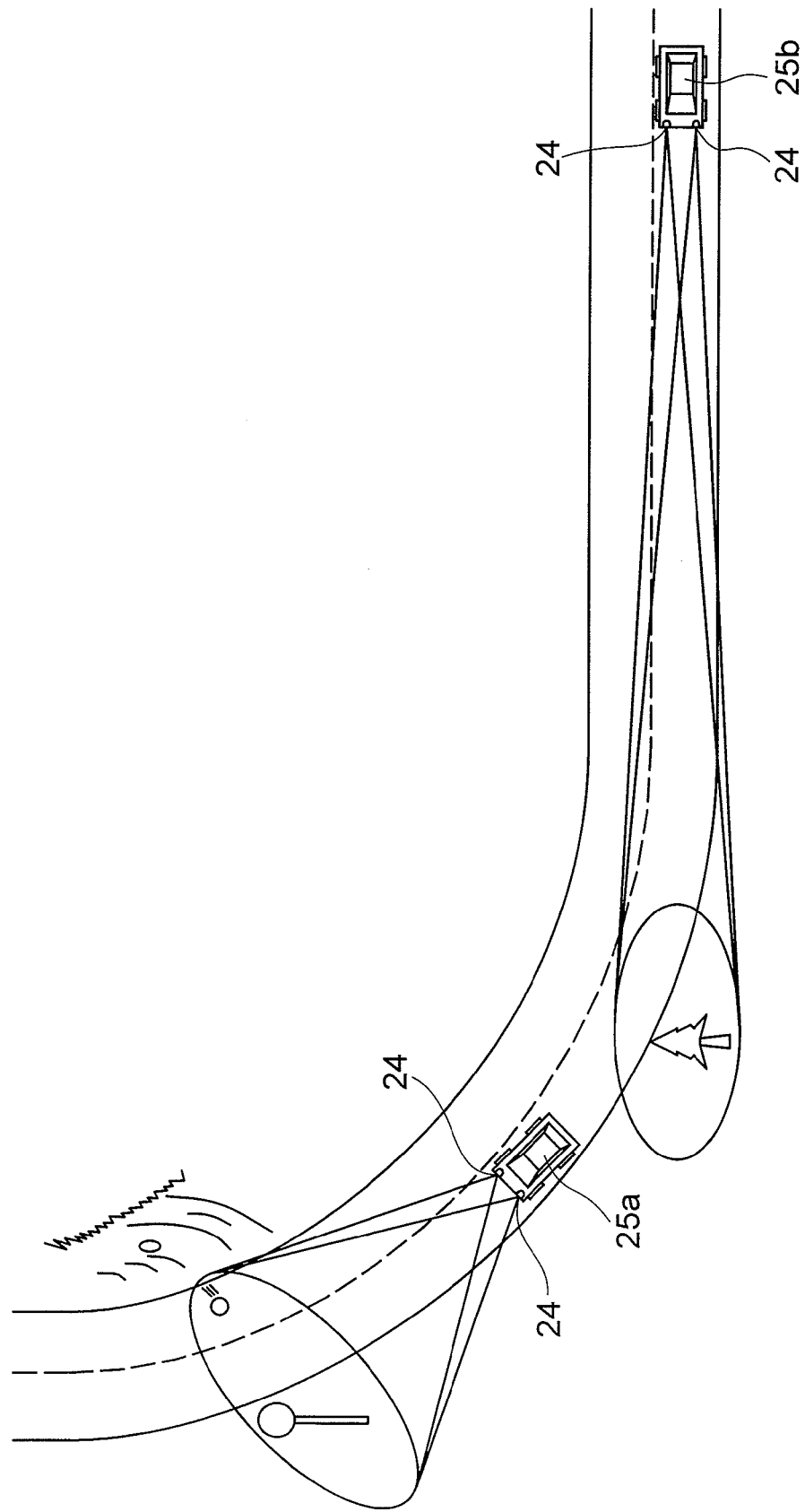
FIG. 11 is a view illustrating a usage mode of a headlight of the motor vehicle.
Figure 12:
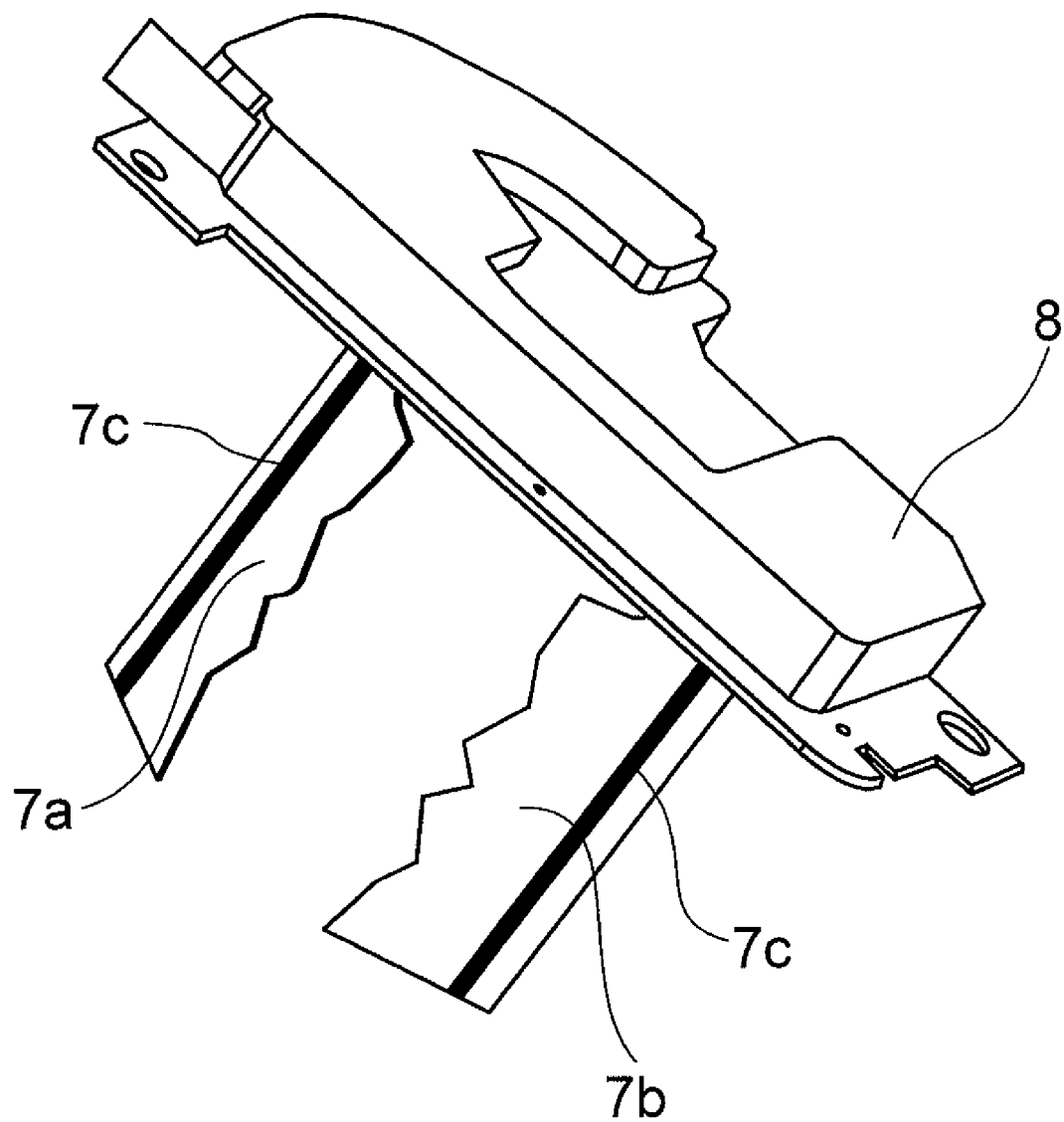
FIG. 12 is a cross-sectional view of a prior art illuminating device.
Figure 13:
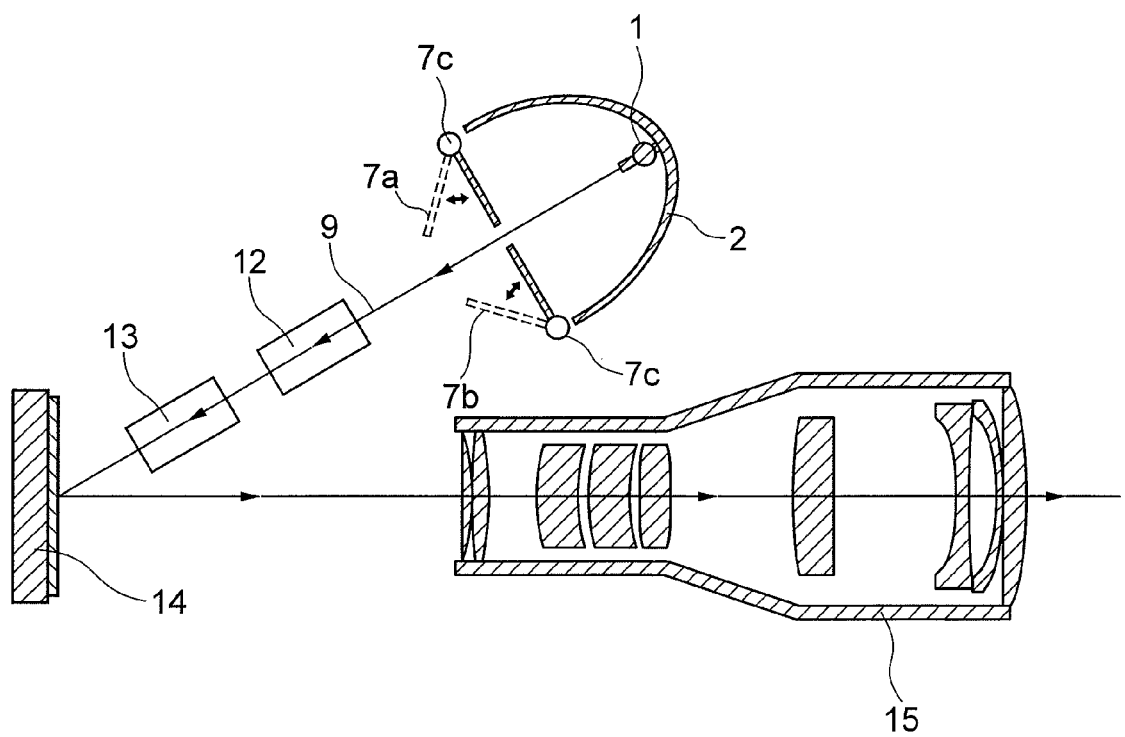
FIG. 13 is a cross-sectional view of an optical apparatus equipped with the prior art illuminating device.

FIG. 11 is a view showing a usage mode of the headlight 24 (illuminating device). As illustrated in FIG. 11, a leading motor vehicle 25a does not narrow down the quantity of light by means of the illuminating device, and therefore, wide-angle light projection may be possible. In contrast, a following motor vehicle 25b narrows down the quantity of light by means of the illuminating device, and therefore, partial light projection may be possible, although the light-projection range is narrow.

The application to a motor vehicle has been described; however, the illuminating device according to the present invention can also be utilized as an illuminating device for other applications such as a shop, an event, and a home.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An illuminating device comprising:
   a light source;
   a first reflector, arranged on an optical center on which the light source is disposed, that irradiates in a forward direction light beams emitted from the light source;
   a second reflector that has an aperture provided on an optical axis thereof and is disposed in front of the first reflector so as to reflect toward the light source the light beams irradiated from the first reflector to condense the light beams;
   a third reflector disposed between the first reflector and the second reflector so as to make the light beams condensed by the second reflector exit through the aperture; and
   a reflector moving means for supporting the second reflector or the third reflector and moving the supported reflector along the optical axis; and wherein
   the reflector moving means moves the second reflector or the third reflector to change distance therebetween, whereby an quantity of light beams that pass through and exit from the aperture is adjusted.

2. The illuminating device according to claim 1, wherein the first reflector and the second reflector are fixed with a predetermined distance, a supporting body is disposed between the first reflector and the second reflector, the third reflector is supported by a side, of the supporting body, that opposes the second reflector, the reflector moving means is disposed outside light paths formed between the first reflector and the second reflector, and the reflector moving means moves the supporting body along the optical axis.

3. The illuminating device according to claim 1, wherein the third reflector is supported by a supporting body, the supporting body and the first reflector are fixed, and the reflector moving means moves the second reflector along the optical axis.

4. The illuminating device according to claim 1, wherein an antireflection film is formed on a region other than regions, of a supporting body, that support the third reflector.

5. The illuminating device according to claim 1, wherein the first reflector, the second reflector, and the third reflector each have a reflection surface having a light reflectance of 97% or larger at wavelength from 420 nm to 680 nm.

6. The illuminating device according to claim 1, wherein the reflector moving means comprises an excitation coil provided on a movable portion of a supporting body that support the second reflector or the third reflector and a permanent magnet that is fixed with a small gap with respect to the excitation coil and extends along the optical axis, and the second reflector or the third reflector is moved by applying a pulse current to the excitation coil.

7. The illuminating device according to claim 1, wherein a light guiding body is disposed in the aperture of the second reflector.

8. The illuminating device according to claim 1, wherein the reflector moving means switches in a plurality of stages the distance between the second reflector and the third reflector.

9. The illuminating device according to claim 1, wherein the distance between the second reflector and the third reflector is adjusted in accordance with a system control signal.

10. The illuminating device according to claim 1, wherein a circulation reflector for recirculating the light beams toward the first reflector is provided on a side, of a supporting body for supporting the third reflector, which opposes the first reflector.

11. The illuminating device according to claim 10, wherein the circulation reflector has a reflection surface having a light reflectance of 97% or larger at wavelength from 420 nm to 680 nm.

12. An image display device comprising:
   an illuminating device for emitting light beams, comprising:
      a light source,
      a first reflector, arranged on an optical center on which the light source is disposed, that irradiates in a forward direction light beams emitted from the light source,
      a second reflector that has an aperture provided on an optical axis thereof and is disposed in front of the first reflector so as to reflect toward the light source the light beams irradiated from the first reflector to condense the light beams,
      a third reflector disposed between the first reflector and the second reflector so as to make the light beams condensed by the second reflector exit through the aperture, and
      a reflector moving means for supporting the second reflector or the third reflector and moving the supported reflector along the optical axis, and wherein
   the reflector moving means moves the second reflector or the third reflector to change distance therebetween, whereby an quantity of light beams that pass through and exit from the aperture is adjusted;
   an image element onto which the light beams emitted from the illuminating device are irradiated and which creates images; and
   a lens unit that projects as projected images the images created by the image element.

* * * * *